United States Patent
Bourbonnais et al.

(10) Patent No.: US 9,244,996 B2
(45) Date of Patent: *Jan. 26, 2016

(54) REPLICATING DATA ACROSS MULTIPLE COPIES OF A TABLE IN A DATABASE SYSTEM

(75) Inventors: Serge Bourbonnais, Palo Alto, CA (US); Elizabeth B. Hamel, Morgan Hill, CA (US); Bruce G. Lindsay, San Jose, CA (US); Stephen J. Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1401 days.

This patent is subject to a terminal disclaimer.

(21) Appl. No.: 11/771,801

(22) Filed: Jun. 29, 2007

(65) Prior Publication Data

US 2007/0288537 A1 Dec. 13, 2007

Related U.S. Application Data

(63) Continuation of application No. 10/789,775, filed on Feb. 27, 2004, now Pat. No. 7,490,083.

(51) Int. Cl.
*G06F 17/30* (2006.01)
(52) U.S. Cl.
CPC ................. *G06F 17/30578* (2013.01)
(58) Field of Classification Search
CPC ................................................ G06F 17/30578
USPC ...................................................... 707/1, 201
See application file for complete search history.

(56) References Cited

U.S. PATENT DOCUMENTS

| | | | |
|---|---|---|---|
| 4,620,276 | A | 10/1986 | Daniell et al. |
| 4,631,673 | A | 12/1986 | Haas et al. |
| 4,646,229 | A | 2/1987 | Boyle |

(Continued)

FOREIGN PATENT DOCUMENTS

EP 0674260 B1 8/2002

OTHER PUBLICATIONS

U.S. Appl. No. 10/789,775.
(Continued)

*Primary Examiner* — Ann J Lo
(74) *Attorney, Agent, or Firm* — Stephen R. Tkacs; Stephen J. Walder, Jr.; Mohammed Kashef

(57) ABSTRACT

A mechanism for handling transaction messages in asynchronous data replication in a database system, in which the database system includes a source node and a target node, and each transaction message has information concerning a row change to a table copy at the source node. The mechanism determines whether a first transaction message has a dependency on a preceding non-completed transaction message. Responsive to the first transaction message having a dependency on the preceding non-completed transaction, the mechanism holds the first transaction message, completes the preceding non-completed transaction message including applying the row change associated with the preceding non-completed transaction message to the table copy at the target node, and responsive to completing the preceding non-completed transaction message, releases the first transaction message and applying the row change associated with the first transaction message to the table copy at the target node.

14 Claims, 4 Drawing Sheets

(56) References Cited

U.S. PATENT DOCUMENTS

| | | | |
|---|---|---|---|
| 4,648,036 A | 3/1987 | Gallant | |
| 4,853,843 A | 8/1989 | Ecklund | |
| 5,758,333 A | 5/1998 | Bauer et al. | |
| 5,787,247 A | 7/1998 | Norin et al. | |
| 5,791,769 A | 8/1998 | Yang | |
| 5,806,075 A | 9/1998 | Jain et al. | |
| 5,832,514 A | 11/1998 | Norin et al. | |
| 5,884,324 A | 3/1999 | Cheng et al. | |
| 5,890,154 A | 3/1999 | Hsiao et al. | |
| 5,894,567 A | 4/1999 | Dodd et al. | |
| 5,916,307 A | 6/1999 | Piskiel et al. | |
| 5,920,860 A | 7/1999 | Maheshwari et al. | |
| 5,991,768 A | 11/1999 | Sun et al. | |
| 5,995,980 A | 11/1999 | Olson et al. | |
| 6,029,177 A | 2/2000 | Sadiq et al. | |
| 6,029,178 A | 2/2000 | Martin et al. | |
| 6,058,389 A | 5/2000 | Chandra et al. | |
| 6,058,401 A | 5/2000 | Stamos et al. | |
| 6,061,689 A | 5/2000 | Chang et al. | |
| 6,067,541 A | 5/2000 | Raju et al. | |
| 6,073,140 A | 6/2000 | Morgan et al. | |
| 6,092,220 A | 7/2000 | Palmer et al. | |
| 6,105,017 A | 8/2000 | Kleewein et al. | |
| 6,122,630 A | 9/2000 | Strickler et al. | |
| 6,144,966 A | 11/2000 | Roberts | |
| 6,154,847 A | 11/2000 | Schofield et al. | |
| 6,202,149 B1 | 3/2001 | Hedegard | |
| 6,209,000 B1 | 3/2001 | Klein et al. | |
| 6,301,589 B1 | 10/2001 | Hirashima et al. | |
| 6,343,219 B1 | 1/2002 | Wada | |
| 6,353,834 B1 | 3/2002 | Wong et al. | |
| 6,412,017 B1 | 6/2002 | Straube et al. | |
| 6,438,558 B1 | 8/2002 | Stegelmann | |
| 6,446,144 B1 | 9/2002 | Habusha et al. | |
| 6,466,950 B1 | 10/2002 | Ono | |
| 6,490,595 B1 | 12/2002 | Candee et al. | |
| 6,526,417 B1 | 2/2003 | Perry | |
| 6,594,676 B1 | 7/2003 | Moore | |
| 6,615,223 B1 | 9/2003 | Shih et al. | |
| 6,622,152 B1 | 9/2003 | Sinn et al. | |
| 6,668,260 B2 | 12/2003 | Zoltan | |
| 6,738,082 B1 | 5/2004 | Dong et al. | |
| 6,865,160 B1 | 3/2005 | Bare | |
| 6,889,231 B1 | 5/2005 | Souder et al. | |
| 6,934,727 B2 | 8/2005 | Berkowitz et al. | |
| 6,973,463 B2 | 12/2005 | Merrells et al. | |
| 6,973,464 B1 | 12/2005 | Gao | |
| 6,976,022 B2 | 12/2005 | Vemuri et al. | |
| 6,993,539 B2 | 1/2006 | Federwisch et al. | |
| 7,003,531 B2 | 2/2006 | Holenstein et al. | |
| 7,031,974 B1 | 4/2006 | Subramaniam | |
| 7,069,295 B2 | 6/2006 | Sutherland et al. | |
| 7,072,911 B1 | 7/2006 | Doman et al. | |
| 7,076,481 B2 | 7/2006 | Osborne et al. | |
| 7,076,508 B2 | 7/2006 | Bourbonnais et al. | |
| 7,085,764 B2 | 8/2006 | Bangel et al. | |
| 7,203,687 B2 | 4/2007 | Adiba et al. | |
| 7,203,712 B2 | 4/2007 | Adiba et al. | |
| 7,240,054 B2 | 7/2007 | Adiba et al. | |
| 7,330,860 B2 | 2/2008 | Adiba et al. | |
| 7,398,285 B2 | 7/2008 | Kisley | |
| 7,490,083 B2 | 2/2009 | Bourbonnais et al. | |
| 2002/0049776 A1 | 4/2002 | Aronoff et al. | |
| 2002/0156761 A1 | 10/2002 | Chen et al. | |
| 2002/0165724 A1 | 11/2002 | Blankesteijn | |
| 2002/0188624 A1 | 12/2002 | Landin et al. | |
| 2003/0041074 A1 | 2/2003 | Vasudevan et al. | |
| 2003/0154238 A1 | 8/2003 | Murphy et al. | |
| 2003/0177194 A1 | 9/2003 | Crocker et al. | |
| 2003/0182319 A1 | 9/2003 | Morrison | |
| 2003/0187857 A1 | 10/2003 | Ford | |
| 2003/0188035 A1 | 10/2003 | Lubbers et al. | |
| 2003/0208511 A1 | 11/2003 | Earl et al. | |
| 2004/0024771 A1 | 2/2004 | Jain et al. | |
| 2004/0162859 A1 | 8/2004 | Guo et al. | |
| 2004/0250032 A1 | 12/2004 | Ji et al. | |
| 2005/0102295 A1 | 5/2005 | Murray et al. | |
| 2005/0108621 A1 | 5/2005 | Kim et al. | |
| 2005/0114285 A1 | 5/2005 | Cincotta | |
| 2005/0149578 A1 | 7/2005 | Sustman et al. | |
| 2005/0193024 A1 | 9/2005 | Beyer et al. | |
| 2005/0193039 A1 | 9/2005 | Adiba et al. | |
| 2005/0193041 A1 | 9/2005 | Bourbonnais et al. | |
| 2005/0193093 A1 | 9/2005 | Mathew et al. | |
| 2005/0223163 A1 | 10/2005 | Ogasawara et al. | |
| 2005/0262055 A1 | 11/2005 | Newport | |
| 2006/0031286 A1 | 2/2006 | Sagawa | |
| 2006/0294333 A1 | 12/2006 | Michaylov et al. | |
| 2007/0067313 A1 | 3/2007 | Garza et al. | |
| 2007/0083569 A1 | 4/2007 | Wong et al. | |
| 2007/0288537 A1 | 12/2007 | Bourbonnais et al. | |
| 2008/0098044 A1 | 4/2008 | Todd | |
| 2008/0163222 A1 | 7/2008 | Bourbonnais et al. | |
| 2009/0037398 A1 | 2/2009 | Horvitz et al. | |
| 2009/0132671 A1 | 5/2009 | Chkodrov et al. | |
| 2010/0161743 A1 | 6/2010 | Krishnamurthi et al. | |

OTHER PUBLICATIONS

U.S. Appl. No. 12/049,196.
Final Office Action mailed Oct. 28, 2010 for U.S. Appl. No. 12/049,196; 14 pages.
Interview Summary mailed Sep. 9, 2010 for U.S. Appl. No. 12/049,196; 3 pages.
Appeal Brief filed Mar. 22, 2011, U.S. Appl. No. 12/049,196, 21 pages.
http://dbforums.com/arch/69/2002/12/634367, 2002, 2 pages.
U.S. Appl. No. 10/788,556.
U.S. Appl. No. 10/788,651.
U.S. Appl. No. 10/789,326.
U.S. Appl. No. 10/789,625.
U.S. Appl. No. 10/789,656.
U.S. Appl. No. 12/964,807.
Bernstein, Philip A., et al., "Context-based prefetch—an optimization for implementing objects on relations", VLDB Journal, 2000, pp. 177-189.
Carino, Jr., Felipe; et al., "StorHouse Metanoia—New Applications for Database, Storage & Data Warehousing", Storage & Data Warehousing, 2001, pp. 521-531.
Gao, Lei et al., "Application Specific Data Replication for Edge Services", May 2003, ACM Press, pp. 449-460.
Haritsa, Javant R. , et al., "Value-Based Scheduling in Real-Time Database Systems", VLDB Journal, 2 117-152, 1993, pp. 117-126.
Haskin, Roger, et al., "Recovery Management in QuickSilver", Feb. 1988, ACM Press, vol. 6, issue 1, pp. 82-108.
Jennings, Roger, "SQL Server 2000 Gains on Oracle", Visual Basic Programmer's Journal, vol. 10, 2000, pp. 20-29.
O'Connell, William, et al., "Optimizer and Parallel Engine Extensions for Handling Expensive Methods Based on Large Objects", IEEE, 1999, pp. 304-313.
Pu, Calton, et al., "Replica Control in Distributed Systems: An Asynchronous Approach", Apr. 1991, ACM Press, vol. 20, issue 2, pp. 377-386.
Stacey, Doug "Replication: D82, Oracle, or Sybase?", Dec. 1995, ACM Sigmod record, vol. 24, issue 4, pp. 95-101.
Dimitrios Georgakopoulos et al., Chronological Scheduling of Transactions with Temporal Dependencies, Dec. 30, 1990.
Gao, Lei et al., "Application Specific Data Replication for Edge Services," ACM 2003, pp. 449-460.
Miled, Zina Ben, "Global Change Master Directory: Object-Oriented Active Asynchronous Transaction Management in a Federated Environment Using Data Agents," ACM 2001, pp. 207-214.
Wolanow, A. "One Enterprise, One Interface," Intelligent Enterprise, vol. 2, No. 4, Mar. 9, 1999, 1 page.
Yu, Haifeng et al., "Design and Evaluation of a Conit-Based Continuous Consistency Model for Replicated Services," ACM 2002, vol. 20, No. 3, pp. 239-282.
Notice of Allowance mailed Sep. 26, 2012 for U.S. Appl. No. 13/437,198, 12 pages.

(56) References Cited

OTHER PUBLICATIONS

Response to Office Action filed with the USPTO on Sep. 18, 2012 for U.S. Appl. No. 13/437,198, 6 pages.
Office Action mailed Jan. 17, 2012 for U.S. Appl. No. 12/049,196; 6 pages.
Petition to Revive, RCE and Response to Final Office Action filed Dec. 23, 2011 for U.S. Appl. No. 10/788,556; 41 pages.
Office Action mailed May 7, 2012 for U.S. Appl. No. 12/964,807; 22 pages.
Response to Office Action filed Apr. 11, 2012, U.S. Appl. No. 12/049,196, 12 pages.
U.S. Appl. No. 13/437,198.
Interview Summary dated Aug. 7, 2012 for U.S. Appl. No. 12/964,807; 3 pages.
Notice of Allowance mailed Jun. 11, 2012 for U.S. Appl. No. 12/049,196; 15 pages.
Notice of Allowance mailed Aug. 16, 2012 for U.S. Appl. No. 12/964,807; 10 pages.
Office Action mailed Jun. 20, 2012 for U.S. Appl. No. 13/437,198; 27 pages.
Response to Office Action filed with the USPTO on Aug. 6, 2012 for U.S. Appl. No. 12/964,807, 10 pages.
Kumar-Chatterjee, Pav, "Q Replication Components in IBM Replication Server", Enterprise Articles IBM, Aug. 2010, 9 pages.

REPLICATING DATA ACROSS MULTIPLE COPIES OF A TABLE IN A DATABASE SYSTEM

CROSS REFERENCE TO RELATED APPLICATIONS

This application is a continuation of application Ser. No. 10/789,775, filed Feb. 27, 2004, the entire contents of which are incorporated by reference herein.

FIELD OF THE INVENTION

The present invention relates to the maintenance of multiple copies of tabular data, and more particularly to providing parallelized apply of asynchronously replicated transactional changes to a target database.

BACKGROUND OF THE INVENTION

In a relational database management system, data is stored in a multiplicity of tables having a multiplicity of rows (records), the rows having a multiplicity of columns (fields). A subset of the columns are designated as key columns and the combination of values of the key columns of the rows of a single table must be distinct. It is frequently desired to maintain copies (replicas) of a first table residing in a first database of the relational variety in one or more other databases of the relational variety. Furthermore, it is desired that changes (inserts, deletes, and updates) to rows of the table in the first database be copied (replicated) to the table copies residing in the other databases. Additionally, it is sometimes desired that the changes made to any of the table copies residing in any of the several relational databases be copied (replicated) to all the other table copies.

The propagation of changes made to one copy of the table may be synchronous or asynchronous to the original change. Synchronous propagation makes changes at all copies as part of the same transaction (unit of work) that initiates the original changes. Asynchronous propagation copies the original changes to the other table copies in separate transactions, subsequent to the completion of the transaction initiating the original changes. Synchronous change propagation requires that the database management systems maintaining all (or most) copies be active and available at the time of the change. Also, synchronous change propagation introduces substantial messaging and synchronization costs at the time of the original changes.

The means of detecting changes to be propagated asynchronously can be active or passive. Active change detection isolates the changes, at the time of the change, for later processing using database triggers or a similar mechanism. Passive change detection exploits information from the database recovery log, where changes are recorded for other purposes, to deduce what rows, of which tables, were changed as well as both the old and new values of changed columns.

In a typical database environment, there are varying levels of parallel transactional processing, involving concurrent transactions that execute read and write actions against database information. Fundamental to the nature of a data replication process is the choice of how to move, order and apply that stream of parallel database event changes to a target database.

One conventional approach provides a certain degree of apply parallelism by grouping related tables into distinct sets and having each set of tables applied by a completely separate program. However, this approach places a heavy burden the user, who may have difficulty knowing which tables are logically related and must be grouped together.

In another conventional approach, parallelism is provided but without preserving the source data event order. Thus, to provide data integrity, a "shadow" table is used to track and maintain each individual data row change. This approach, however, has a significant overhead cost in both making updates and in performing lookups against the shadow table. Other conventional approaches provide parallelism but by using a very proprietary way that has no or limited applicability outside of a specific system.

BRIEF SUMMARY OF THE INVENTION

In general, in one aspect, this specification describes a method for handling transaction messages in asynchronous data replication in a database system, in which the database system includes a source node and a target node, and each transaction message has information concerning a row change to a table copy at the source node. The method includes determining whether a first transaction message has a dependency on a preceding non-completed transaction message. Responsive to the first transaction message having a dependency on the preceding non-completed transaction, the method further includes holding the first transaction message, completing the preceding non-completed transaction message including applying the row change associated with the preceding non-completed transaction message to the table copy at the target node, and responsive to completing the preceding non-completed transaction message, releasing the first transaction message and applying the row change associated with the first transaction message to the table copy at the target node.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

The details of one or more implementations are set forth in the accompanying drawings and the description below. Features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

This specification describes a method for providing parallel apply in asynchronous data replication in a database system. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
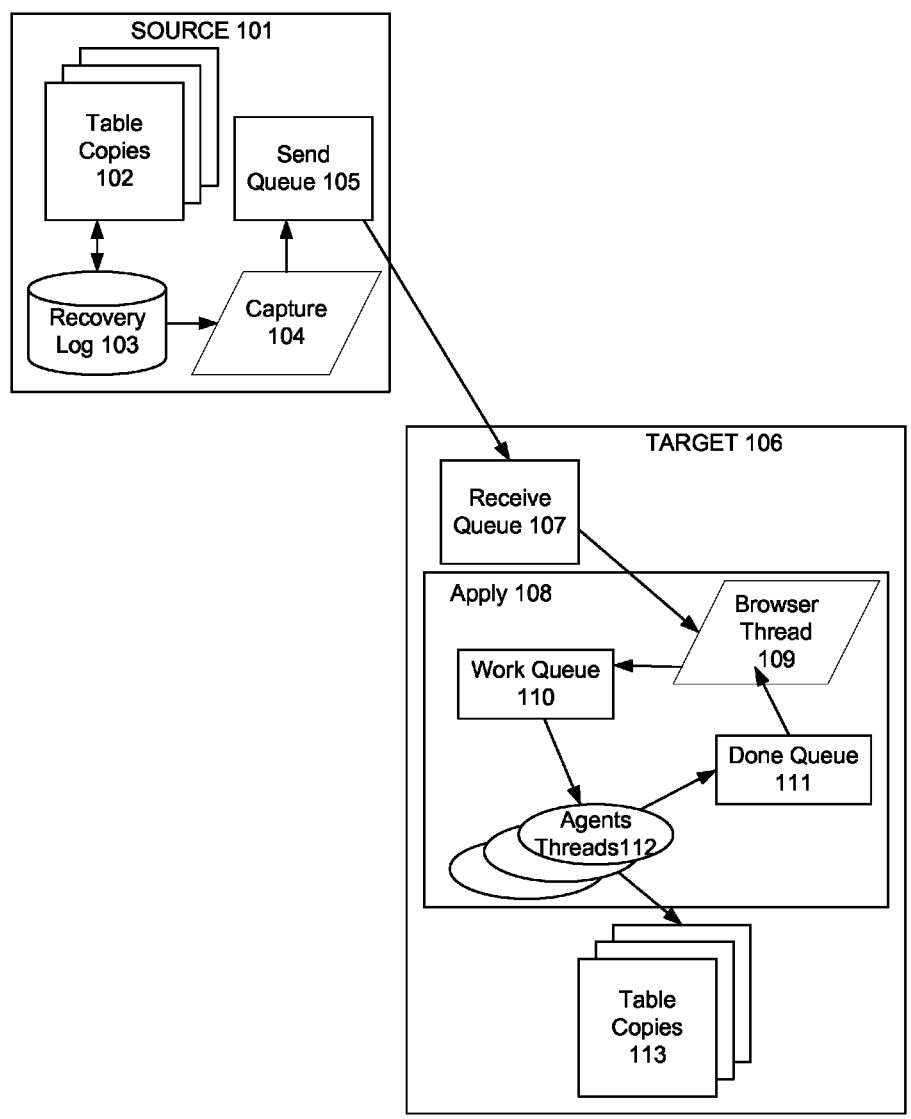
FIG. 1 illustrates a system for providing parallel apply in asynchronous data replication in a database system in accordance with one implementation.

FIG. 1 illustrates one implementation of a system for providing parallel apply in asynchronous data replication in a database system. The system includes a source node 101 and a target node 106. At the source node 101 are one or more source table copies 102, a recovery log 103, a Capture program 104 ("Capture"), and a send queue 105. At the target node 106 are a receive queue 107, an Apply program ("Apply") 108 and one or more target table copies 113. Apply 108 includes a browser thread 109, a work queue 110, a done queue 111, and one or more agent threads 112. Capture 104 reads changes of committed transactions from the recovery log 103 and sends them to Apply 108 running on the target node 106. Apply 108 eventually re-executes the changes of the transactions.

In one implementation, the tabular data at the source table copies 102 whose changes are to be replicated to the target table copies 113 reside in a Relational Database management System (RDBMS) such as the DB2™ RDBMS product offered by International Business Machines Corporation™. The RDBMS maintains a recovery log 103 and a means to query its contents. The entries of the recovery log 103 describe changes to rows of the source tables 102 at source node 101. More specifically, the entries in the recovery log 103 contain information defining (1) the table being changed, (2) the value of the key column in the row being changed, (3) the old and new values of all columns of the changed row, and (4) the transaction (unit of work) containing the change. Recovery log entries for inserted rows contain only new column values while recovery log entries for deleted rows contain only old column values. Recovery log entries for updated rows contain the new and old values of all row columns. The order of entries in the recovery log reflect the order of change operations within each transaction and the order of transaction commit records reflects the order in which transactions are completed. The format of a row change log record can be abstracted as follows:

| type | transid | tableId | old key cols | old non-key cols | new key cols | new non-key cols |

To control the propagation of changes to table copies, copy control tables (not shown) designating table copies and their target table copies are used by the replication system. The control information includes, but is not limited to: (1) the name of the copied table, (2) a list of the table copies' key columns, (3) filtering and projection information, and (4) the message channels on which to send descriptions of changes to the target table copies.

The list of key columns defined for a replication definition will be hereafter referred to as the "replication key". The replication key should not be confused with other attributes of source or target table copies which may use primary key columns or foreign key columns. However, it is possible that the primary key of a source or target table copy may be comprised of the same set of columns as are specified for the replication key. The replication key uniquely identifies a row entity in a target table copy so that it can be located by Apply, in applying an update or delete change operation. Because the replication key uniquely identifies a row entity, it is used in the serialization of changes made to these unique row entities.

The type of row operation in change log records can be delete, insert, update, or key update. Updates that do not modify the replication key (update) are distinguished from updates that do modify the replication key (key update).

The changes made to table copies are determined by reading the recovery log. Changes are saved in memory until a transaction commit record is seen on the recovery log. Only committed transactions at the source node 101 are moved and applied to target nodes 106. Change records are grouped into their originating source transaction units and written as one logical message unit. Because a logical transaction message can be quite large, it may be broken down into a plurality of physical messages. In this specification, a "transaction message" refers to a logical transaction message. Changes to be sent to the other table copies are sent via logical message units on the recoverable queues (e.g. send queue 105 and receive queue 107) designated in the copy control tables for the table copies of the log records.

The transactions messages are put on the recoverable queue in the source commit order. Within each transaction, the change records are arranged in the order in which they occurred within the source transaction. In one implementation, there is no inherent parallelism in the movement of the committed transactional data. The queuing of the transactional data is serialized such that data is moved to the target node 106 in the source transactional commit order.

In capturing the information for individual change records, the type of change operation for each change determines what replication key column values will be sent as part of that change record. For insert and update types of change records, the new replication key column values are sent as part of the change records within the transaction message. By definition, an insert is a new record and therefore has no old values. By definition, the new replication key column values of an update type of change record must be the same as the old replication key column values. For delete type change records, there is by definition no new record, only an old record, and therefore the old replication key column values are sent. For key update records, the old replication key column values are sent in addition to the new replication key column values.

Returning to FIG. 1, for any given receive/recoverable queue 107 that is populated with transactions from a given source node 101 and is to be used as the source of changed data to be applied to a given target node 106, Apply 108 has a browser thread 109 and one or more agent threads 112, where the number of agents is determined through user input. The work queue 110 and the done queue 111, structures internal to Apply 108, are created for the purpose of communication between the browser thread 109 and the agent threads 112.

Figure 2:
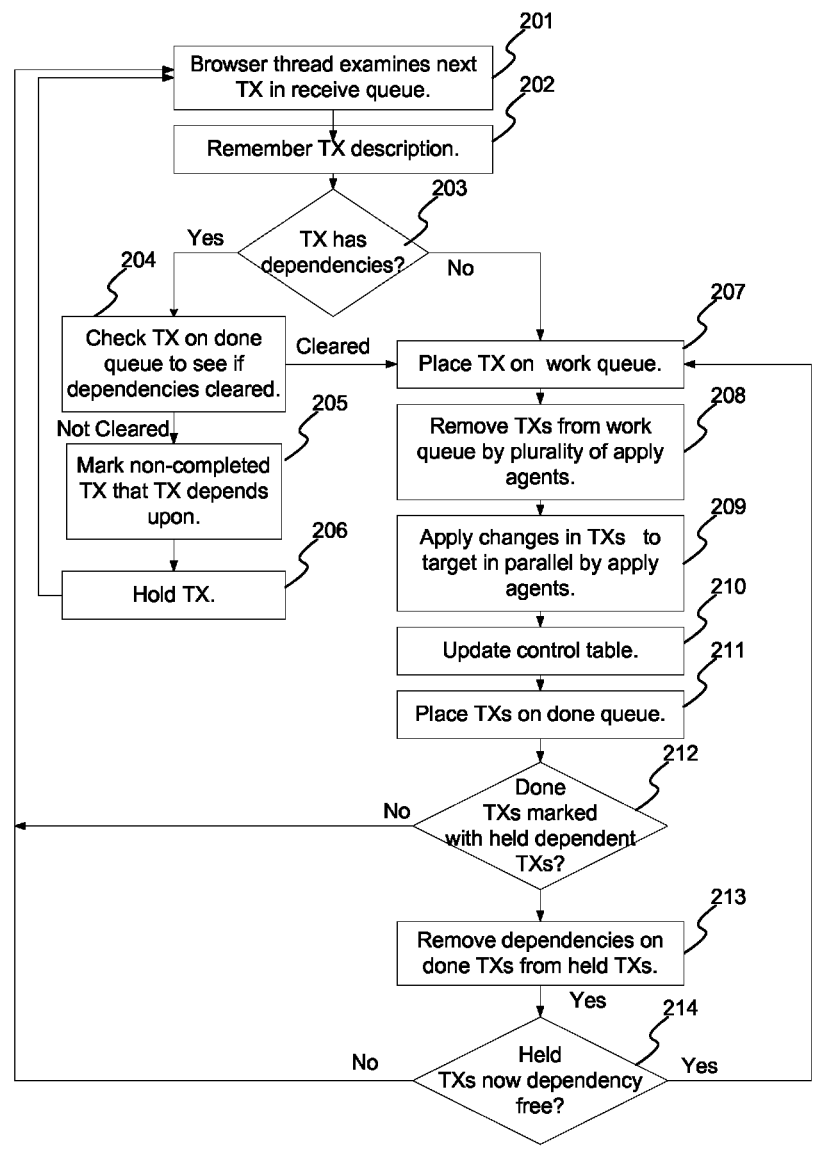
FIG. 2 is a flowchart illustrating a method for providing parallel apply in asynchronous data replication in a database system in accordance with one implementation.

FIG. 2 is a flowchart illustrating one implementation of a method for providing parallel apply in asynchronous data replication in a database system. First, the browser thread 109 examines the next transaction message in the receive queue 107, via step 201. The values of the replication key columns for each row change in the transaction message is remembered, via step 202. In one implementation, information describing the transaction, including the values of the replication key columns, is remembered, i.e., stored in a logical data structure, and tracked. Other information concerning the transaction can also be remembered. The logical data structure also tracks any preceding non-completed transaction messages, including any subsequent transaction messages that are dependent upon the transaction message.

Next, the browser thread 109 determines if the transaction message has dependencies, via step 203. A transaction message has a dependency if the preservation of the integrity of the data requires that one or more preceding non-completed transaction messages be applied prior to the application of the current transaction message. If the transaction message has dependencies, then the browser thread 109 checks the transaction messages on the done queue 111 to see if the completion of any of those transaction messages clears the dependencies, via step 204. If not, then non-completed transaction messages upon which the transaction message is dependent are marked to indicate the transaction message's dependency, via step 205. The current transaction message is also marked with its dependencies and held, via step 206, and not allowed to be applied. If it does not have any dependencies, then the transaction message can be applied in parallel with the preceding transaction(s) currently being applied, and is thus placed on the work queue 110, via step 207. Once placed on the work queue 110, the transaction message becomes eligible to be applied by any available agent thread 112. The more agent threads 112 that are made available to be used, the more transaction messages which are eligible for application can be applied in parallel.

In one implementation, application of the changes is performed using generated Structured Query Language (SQL) statements of a non-proprietary nature. These SQL statements may or may not be exactly the same as the originating SQL statements made at the source node 101. However, the net effect of these changes is typically identical to the net effect of the changes made by the originating SQL statements. For example, an originating SQL statement such as "DELETE FROM SOURCE.TABLE" could be made. This statement would have the effect of deleting all rows from the table named SOURCE.TABLE. If there were five rows in the table at this point in time, then there would be five rows deleted, and five log records would be generated on the recovery log. Each log record would indicate the delete operation of one of the five rows. From the inspection of the recovery log, the five operations would be used to capture the information of five distinct data events, all of which occurred during a single transaction. This transaction would be queued and moved to the target node 106, and the application of these changes would be made as five distinct SQL statements, with each SQL statement targeting one of the individual rows of the corresponding target table copy. At the commit point of this applied transaction, the functional equivalence point is then reached, such that the same five rows have been deleted from the corresponding source and target table copies. Thus, the method and system in accordance with the present invention is a non-proprietary implementation of Apply. It could be extended for use in any database that accepts standard SQL and has the general database property of atomicity.

Once the application is complete, the transaction message is placed on the done queue 111, via step 211. The indicators of held transaction messages dependent on this now completed transaction message, if any exist, which were previously marked (via step 205) can now be checked, via step 212. These held transaction messages will be changed to remove the dependency or dependencies that existed regarding the now completed transaction message, via step 213. After removal of these dependencies, each of the held transaction messages are checked to see if any other dependencies remain, via step 214, against other preceding still non-completed transaction messages. Any held transaction message that is now determined to be dependency free, via step 214, can be safely applied in parallel with the other transaction messages currently being applied, and thus placed on the work queue 110, via step 207. For held transaction messages with remaining dependencies, they remain as held transaction messages.

Figure 3:
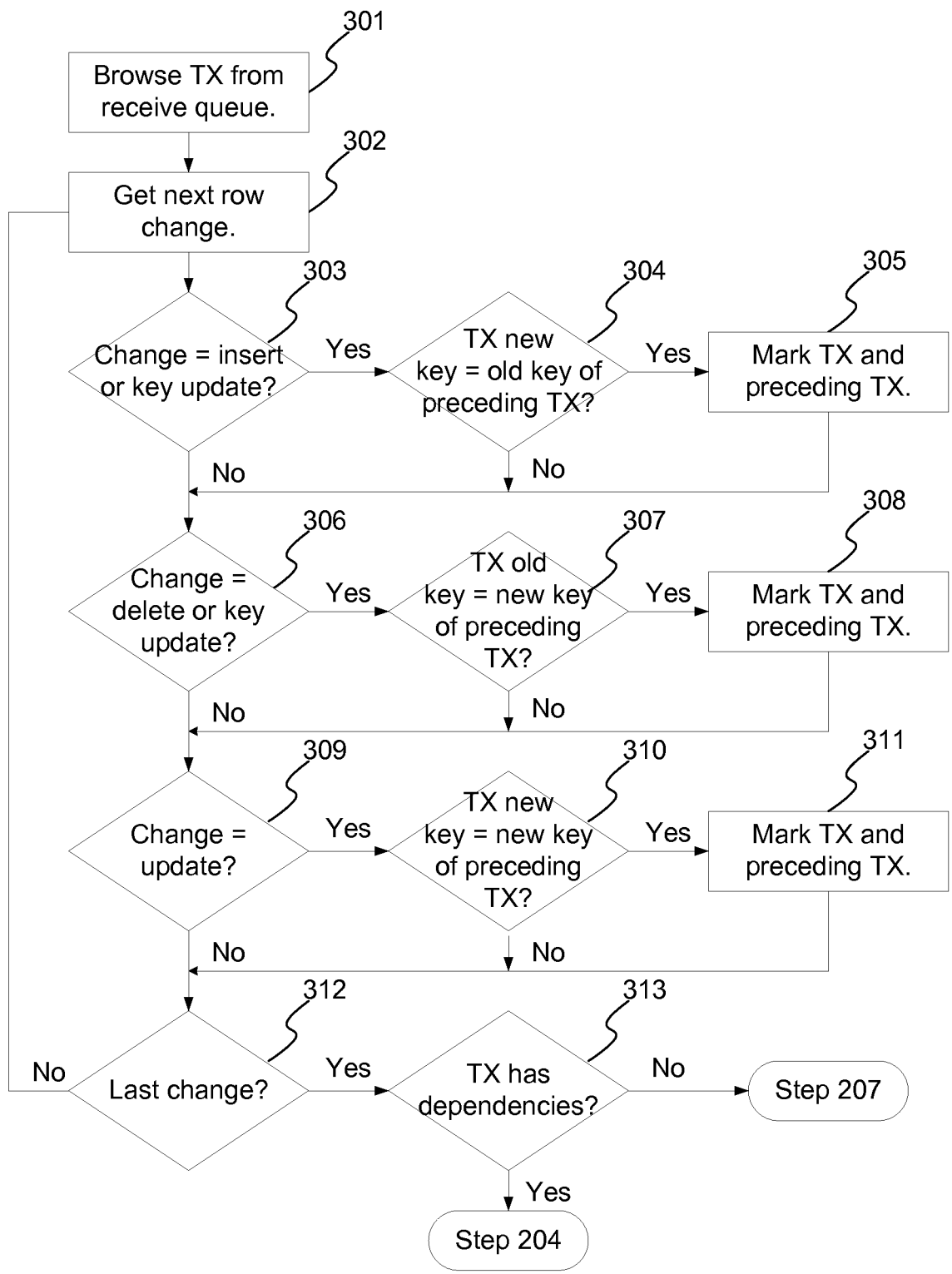
FIG. 3 is a flowchart illustrating in more detail one implementation of the determination of dependencies in the method for providing parallel apply in asynchronous data replication in a database system.

FIG. 3 is a flowchart illustrating in more detail the determining of dependencies in the method for providing parallel apply in asynchronous data replication in a database system. For every transaction message that the browser thread 109 examines, critical pieces of information regarding that transaction are assessed and tracked. For each row change that makes up the transaction message, information regarding the values of the replication key columns is noted and tracked as part of that transaction. From the time of the initial examination of a transaction by the browser thread 109 until the eventual placement of that transaction message on the done queue 111 after successful application, the replication key column information for every row change within this transaction message is used to assess newly arriving transactions, to determine their eligibility for placement on the work queue 110. If a newly assessed transaction message contains row changes with replication key column values that match the values of the replication key columns from row change of any preceding transaction messages that have not yet completed, then this newly assessed transaction message is not eligible yet for application and must not yet be placed on the work queue 110.

As illustrated in FIG. 3, the browser thread 109 examines a transaction message in the receive queue, via step 301. The transaction message can contain a plurality of row changes. For each of the row changes, steps 302 through 312 are performed. The browser thread 109 examines the next change in the transaction message, via step 302. If the type of change is an insert or key update, via step 303, then the browser thread 109 determines if the new replication key value of the insert or key update change is the same as the old replication key value of any preceding non-completed transaction messages, via step 304. If they are the same, then the preceding non-completed transaction message is marked to indicate the transaction message's dependency, and the transaction message is marked to indicate the preceding non-completed transaction message upon which it depends, via step 305.

The new replication key column values of an insert or key update type of row change represent the introduction of a new row entity. Either of these row actions could have been preceded by a delete of that row entity (carrying old replication key column values) or by a key update which had the net effect of a delete followed by an insert, where it would be the delete aspect of the prior row action that could potentially have commonality with this row action and is therefore of interest. Therefore, the new replication key column values of an insert or key update row change are compared to the old replication key column values of all preceding non-completed transaction messages.

The method by which it is determined that a new or old replication key value is the same as another new or old replication key value can be relaxed so long as the same replication key values are not determined to be different. Those with ordinary skill in the art at the time of the invention will recognize that the comparison of the result of any deterministic function (e.g., a hash code function) can be used to insure that identical replication key values are matched, while differing replication key values may be incorrectly matched. The performance benefits of simplified comparing can outweigh the loss of parallelism due to incorrectly matched replication key values.

If the type of change is a delete or a key update, via step 306, then the browser thread 109 determines if the old replication key value of the delete or key update change is the same as the new replication key value of any preceding non-completed transaction message, via step 307. If they are the same, then the preceding non-completed transaction message is marked to indicate the transaction message's dependency, and the transaction message is marked to indicate the preceding non-completed transaction message upon which it depends, via step 308.

The new replication key column values of an update type of row change represent the change of non-replication key column values of an existing row entity. This row action could have been preceded by an insert of that row entity (carrying new replication key column values), or by a key update which had the net effect of a delete followed by an insert, where it would be the insert aspect of the prior row action that could potentially have commonality with this row action and is therefore of interest. Therefore, the new replication key column values of an update row change are compared to the new replication key column values of all preceding non-completed transaction messages.

If the type of change is an update, via step 309, then the browser thread 109 determines if the new replication key value of the update change is the same as the new replication key value of any preceding non-completed transaction message, via step 310. If they are the same, then the preceding non-completed transaction message is marked to indicate the transaction message's dependency, and the transaction message is marked to indicate the preceding non-completed transaction message upon which it depends, via step 311.

The old replication key column values of a delete or key update type of row change represent the deletion of an existing row entity. Either of these row actions could have been preceded by an insert of that row entity (carrying new replication key column values), by an update of that row entity (carrying new replication key column values), or by a key update which had the net effect of a delete followed by an insert, where it would be the insert aspect of the prior row action that could potentially have commonality with this row action and is therefore of interest. Therefore, the old replication key column values of a delete or key update row change are compared to the new replication key column values of all preceding non-completed transaction messages.

Once the last change in a transaction message has been examined, via step 312, and the transaction message is determined to have dependencies, via step 313, the process continues with step 204 (FIG. 2). If the transaction message is determined to have no dependencies, then the process continues with step 207 (FIG. 2).

With the method in accordance with the present invention, whole source transactions are executed as whole target transactions, and changes to any individual table row entity, as determined by the specified and required replication key column values, are serialized to the same degree that those changes were serialized at the source database. Transactions with no dependencies are likely to be committed in a different order from the source commit order.

Figure 4:
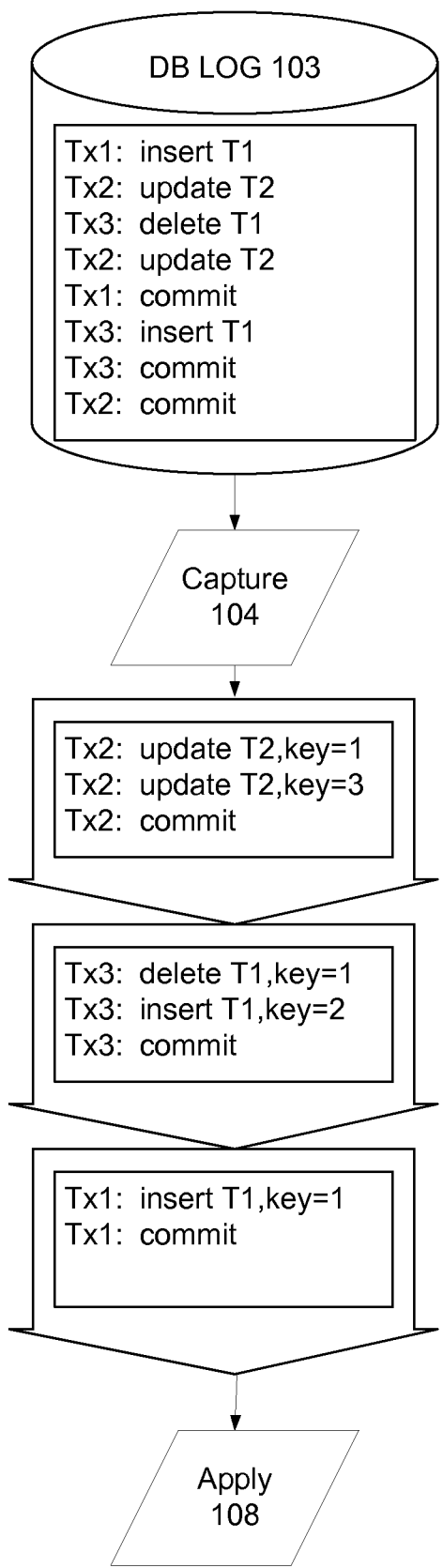
FIG. 4 illustrates an example of the method for providing parallel apply in asynchronous data replication in a database system.

FIG. 4 illustrates an example of the method for providing parallel apply in asynchronous data replication in a database system. The transaction data found in the recovery log 103 is grouped by transaction and those transactions are sent to the send queue 105 in source commit order. For example, transaction 1 (Tx1), transaction 2 (Tx2), and transaction 3 (Tx3) were started in Tx1-Tx2-Tx3 order, but were committed in Tx1-Tx3-Tx2 order. Thus, they are sent to the receive queue 107 in committed Tx1-Tx3-Tx2 order.

When Tx1 arrives on the receive queue 107, the browser thread 109 examines Tx1, via step 201. Information concerning Tx1 is remembered, via step 202. Such information includes the fact that Tx1 involves an insert into table T1 of a row with replication key value=1. Since there are no preceding transactions, Tx1 has no dependencies, via step 203. Tx1 is thus placed on the work queue, via step 207.

As Tx1 is removed from the work queue, via step 208, and being applied, via step 209, the browser thread 109 examines Tx3, via step 201. Information concerning Tx3 is remembered, via step 202. Such information includes the fact that Tx3 involves a delete from table T1 of a row with replication key value=1 and an insert into table T1 a row with replication key value=2. The browser thread 109 determines that Tx3 has a dependency for table T1 delete, since the old replication key value of the delete (key=1) is the same as the new replication key value for the insert in Tx1, via step 307. Assuming that Tx1 has not yet completed, there are no transaction messages on the done queue 111 so steps 204 and 205 are not performed. Tx1 is thus marked to indicate the dependency of Tx3, and Tx3 is marked to indicate it is dependent upon Tx1, via step 308. Tx3 is held, via step 206.

The browser thread 109 next examines Tx2 after it arrives on the receive queue 107, via step 201. Information concerning Tx2 is remembered, via step 202. Such information includes the fact that Tx2 involves an update in table T2 of a row with replication key=1, and an update in table T2 of a row with replication key=3. The browser thread 109 determines that Tx2 has no dependencies, via step 203 (and step 310), and places Tx2 on the work queue 110, via step 207.

When application of Tx1 completes, via step 209, the control table is updated to indicate its completion, via step 210. Tx1 is also placed on the done queue 111, via step 211. From the marks added to Tx1 above, the browser thread 109 knows to remove from Tx3 its dependency upon Tx1. The browser thread 109 then checks if Tx3 is now dependency free, via step 212. Since Tx3 is now dependency free, it is placed on the work queue, via step 207.

In one implementation, the receive queue 107 is a persistent queue, while the work queue 110 and the done queue 111 are not. The persistence of the receive queue 107 is to protect the integrity of the data in case of a system failure or some other interruption during the transaction application process. However, the persistent nature of the receive queue 107 requires that messages in the receive queue 107 be removed after transactional messages have been successfully applied. Otherwise, if the process is interrupted, the system upon restart will attempt to apply the changes in the transaction messages on the receive queue 107 again, leading to errors.

One possible method of removal is a two-phase commit approach, where the delete of the message from the receive queue 107 is committed as part of the same transaction at the target node 106 that applies the changes. Another method is to use an asynchronous "cleanup" approach, as described below. The asynchronous cleanup approach has the advantage of defraying the delay and overhead costs associated with the two-phase commit approach.

In the asynchronous cleanup approach, it is noted that a control table is updated and committed as part of the transaction that applies the changes associated with a logical replication transaction message at a target node 106. This allows for a background task to be executed on a periodic basis which deletes messages from the receive queue 107 based on the existence of an entry in the control table indicating that this message has been successfully applied. After the delete of one or more logical transaction messages from the receive queue 107 has been committed, entries for the logical transmission message from the control table can be safely removed. If the logical transaction message comprises a plurality of physical transaction message, then each physical transaction has its own entry in the control table. Each entry for the physical messages is individually removed. This approach avoids the cost of a two-phase commit since the control table rows are deleted after the committed delete of the messages on the receive queue 107. If entries in the control table exist without corresponding queue messages because those messages have already been deleted due to some process interruption, this poses no possible harm to the system, and such extra control table rows can be safely removed at anytime.

A method for providing parallel apply in asynchronous data replication in a database system has been disclosed. The method and system provides a high speed parallel apply of transactional changes to a target node such that the parallel nature of the application of changes does not compromise the integrity of the data. The method and system detects, tracks, and handles dependencies between transaction messages to be applied to the target node. If a transaction message has a dependency on one or more preceding transaction messages whose applications have not yet completed, that transaction message is held until the application completes. In addition, the method and system requires significantly less overhead than conventional approaches and is easily adaptable to various types of database systems.

Modification may be made to the implementations discussed above and those modifications are within and scope of the present invention. Accordingly, many modifications may be made by one of ordinary skill in the art without departing from the scope of the appended claims.

What is claimed is:

1. A method for handling transaction messages in asynchronous data replication in a database system, the database system including a source node and a target node, the method comprising:
   receiving a first transaction message from the source node in a receive queue of the target node, wherein the first transaction message comprises at least one recovery log entry for a row change on a table copy at the source node;
   determining whether the first transaction message depends on a preceding non-completed transaction message;
   responsive to the first transaction message not depending on the preceding non-completed transaction, applying the row change associated with the first transaction message to the table copy at the target node without holding the first transaction message; and
   responsive to application of the row change associated with the first transaction message being complete, placing the first transaction message in a done queue at the target node,
   wherein applying the row change associated with the first transaction message to the table copy at the target node comprises:
      placing the first transaction message in a work queue at the target node; and
      applying the row change associated with the first transaction message in parallel with applying a row change associated with the preceding non-completed transaction message via a plurality of agent threads at the target node.

2. The method of claim 1, wherein determining whether the first transaction message depends on the preceding non-completed transaction message comprises:
   determining that the row change of the first transaction message is an insert or a key update type of change;
   comparing a new replication key value in the row change of the first transaction message to an old replication key value of a row change of the preceding non-completed transaction message; and
   determining that the first transaction message depends on the preceding non-completed transaction message if the new replication key value in the row change of the first transaction message is the same as the old replication key value in the row change of the preceding non-completed transaction message,
   wherein comparing the new replication key value in the row change of the first transaction message to the old replication key value of the row change of the preceding non-completed transaction message comprises:
   comparing a hash value of the new replication key value in the row change of the first transaction value of old replication key value in the row change of the preceding non-completed transaction message.

3. The method of claim 1, wherein determining whether the first transaction message depends on the preceding non-completed transaction message comprises:
   determining that the row change of the first transaction message is a delete or a key update type of change;
   comparing an old replication key value in the row change of the first transaction message to a new replication key value in a row change of the preceding non-completed transaction message; and
   determining that the first transaction message depends on the preceding non-completed transaction message if the old replication key value in the row change of the first transaction message is the same as the new replication key value in the row change of the preceding non-completed transaction message,
   wherein comparing the old replication key value in the row change of the first transaction message to the new replication key value in the row change of the preceding non-completed transaction message comprises:
   comparing a hash value of the old replication key value in the row change of the first transaction message to a hash value of the new replication key value in the row change of the preceding non-completed transaction message.

4. The method of claim 1, wherein determining whether the first transaction message depends on the preceding non-completed transaction message comprises:
   determining that the row change of the first transaction message is an update type of change;
   comparing a new replication key value in the row change of the first transaction message to a new replication key value in a row change of the preceding non-completed transaction message; and
   determining that the first transaction message depends on the preceding non-completed transaction message if the new replication key value in the row change of the first transaction message is the same as the new replication key value in the row change of the preceding non-completed transaction message,
   wherein comparing the new replication key value in the row change of the first transaction message to the new replication key value in the row change of the preceding non-completed transaction message comprises:
   comparing a hash value of the new replication key value in the row change of the first transaction message to a hash value of the new replication key value in the row change of the preceding non-completed transaction message.

5. A system for handling transaction messages in asynchronous data replication in a database system, the system comprising:
   a source node computing device; and
   a target node computing device, wherein the target node computing device comprises:

a receive queue configured to receive a first transaction message from the source node computing device, wherein the first transaction message comprises at least one recovery log entry for a row change on a table copy at the source node; and an apply program, wherein the apply program, when executed by the target node computing device, causes the target node computing device to:

determine whether the first transaction message depends on a preceding non-completed transaction message;

responsive to the first transaction message not depending on the preceding non-completed transaction, apply the row change associated with the first transaction message to the table copy at the target node without holding the first transaction message; and responsive to application of the row change associated with the first transaction message being complete, place the first transaction message in a done queue at the target node, wherein applying the row change associated with the first transaction message to the table copy at the target node comprises:

placing the first transaction message in a work queue at the target node; and applying the row change associated with the first transaction message in parallel with applying a row change associated with the preceding non-completed transaction message via a plurality of agent threads at the target node.

6. The system of claim 5, wherein determining whether the first transaction message depends on the preceding non-completed transaction message comprises:

determining that the row change of the first transaction message is an insert or a key update type of change;

comparing a hash value of the new replication key value in the row change of the first transaction message to a hash value of the old replication key value in the row change of the preceding non-completed transaction message; and determining that the first transaction message depends on the preceding non-completed transaction message if the hash value of the new replication key value in the row change of the first transaction message is the same as the hash value of the old replication key value in the row change of the preceding non-completed transaction message.

7. The system of claim 5, wherein determining whether the first transaction message depends on the preceding non-completed transaction message comprises:

determining that the row change of the first transaction message is a delete or a key update type of change;

comparing a hash value of the old replication key value in the row change of the first transaction message to a hash value of the new replication key value in the row change of the preceding non-completed transaction message; and determining that the first transaction message depends on the preceding non-completed transaction message if the hash value of the old replication key value in the row change of the first transaction message is the same as the hash value of the new replication key value in the row change of the preceding non-completed transaction message.

8. The system of claim 5, wherein determining whether the first transaction message depends on the preceding non-completed transaction message comprises:

determining that the row change of the first transaction message is an update type of change;

comparing a hash value of the new replication key value in the row change of the first transaction message to a hash value of the new replication key value in the row change of the preceding non-completed transaction message; and determining that the first transaction message depends on the preceding non-completed transaction message if the hash value of the new replication key value in the row change of the first transaction message is the same as the hash value of the new replication key value in the row change of the preceding non-completed transaction message.

9. The method of claim 1, further comprising:

responsive to the first transaction message depending on the preceding non-completed transaction, holding the first transaction message;

completing the preceding non-completed transaction message including applying the row change associated with the preceding non-completed transaction message to the table copy at the target node; and responsive to completing the preceding non-completed transaction message, releasing the first transaction message and applying the row change associated with the first transaction message to the table copy at the target node.

10. The method of claim 1, wherein determining whether the first transaction message depends on a preceding non-completed transaction message comprises:

responsive to a determination that the first transaction message depends on a preceding transaction message, checking the done queue to determine whether the preceding transaction message is a completed transaction message; and responsive to the preceding transaction message being a completed transaction message, determining that the first transaction message does not depend on a preceding non-completed transaction message.

11. The method of claim 1, further comprising:

responsive to application of the row change associated with the first message being complete, adding an entry to a control table to indicate that the first transaction message is complete; and removing, by a background thread in the target node, transaction messages corresponding to entries in the control table from the receive queue.

12. The system of claim 5, wherein the apply program further causes the target node computing device to:

responsive to the first transaction message depending on the preceding non-completed transaction, hold the first transaction message;

complete the preceding non-completed transaction message including applying the row change associated with the preceding non-completed transaction message to the table copy at the target node; and responsive to completing the preceding non-completed transaction message, release the first transaction message and applying the row change associated with the first transaction message to the table copy at the target node.

13. The system of claim 5, wherein determining whether the first transaction message depends on a preceding non-completed transaction message comprises:

responsive to a determination that the first transaction message depends on a preceding transaction message, checking the done queue to determine whether the preceding transaction message is a completed transaction message; and responsive to the preceding transaction message being a completed transaction message, determining that the first transaction message does not depend on a preceding non-completed transaction message.

14. The system of claim 5, wherein the receive queue is a persistent queue and wherein the work queue and the done queue are non-persistent queues.

* * * * *